(No Model.)

M. G. DAVIS.
DUST SEPARATOR.

No. 556,534. Patented Mar. 17, 1896.

WITNESSES.
Matthew M. Blunt.
J. Murphy.

INVENTOR.
Milton G. Davis
By Jas. H. Churchill
ATT'Y.

UNITED STATES PATENT OFFICE.

MILTON G. DAVIS, OF SOMERVILLE, ASSIGNOR OF ONE-THIRD TO BENJAMIN F. TRIPP, OF BOSTON, MASSACHUSETTS.

DUST-SEPARATOR.

SPECIFICATION forming part of Letters Patent No. 556,534, dated March 17, 1896.

Application filed June 5, 1895. Serial No. 551,777. (No model.)

*To all whom it may concern:*

Be it known that I, MILTON G. DAVIS, a citizen of the United States, residing in Somerville, county of Middlesex, and State of Massachusetts, have invented an Improvement in Dust-Separators, of which the following description, in connection with the accompanying drawings, is a specification, like letters on the drawings representing like parts.

This invention relates to apparatus of that class commonly called "dust-separators," and has for its object to provide an apparatus for the purpose specified which works in a novel manner, as will be described, whereby a more effective separation of the air from the dust is accomplished.

The particular features of this invention will be pointed out in the claim at the end of this specification.

Figure 1:
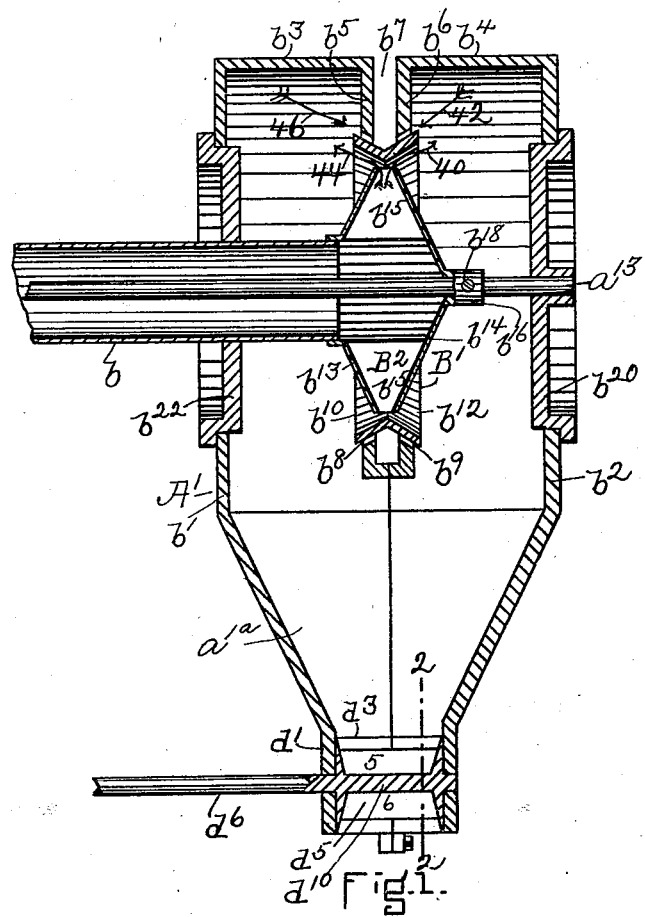
Figure 2:
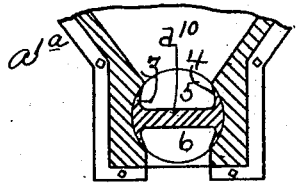

Figure 1 represents in vertical transverse section a dust-separator embodying this invention, and Fig. 2 a sectional detail on line 2 2, Fig. 1.

Referring to the drawings, $A'$ represents a box or case containing the operative parts of the separator embodying this invention, the said box or case being preferably substantially circular at its upper portion and substantially V-shaped at its lower portion to form a hopper $a'^a$, into which the dust and heavier particles in the air are precipitated.

The box or case $A'$ is provided with the side walls $b'$ $b^2$, having secured to or forming part of them a rim composed of two sections $b^3 b^4$, provided, as herein shown, with substantially central inwardly-projecting walls $b^5$ $b^6$, separated by an annular passage $b^7$, and having substantially large central openings $b^8$ $b^9$, into which extend two parts $b^{10}$ $b^{12}$ of an annular V-shaped body constituting a deflector $B'$, as will be described, the said V-shaped body being sustained in the openings $b^8 b^9$ by suitable arms (not herein shown) attached to the circular walls $b^5$ $b^6$ or in other suitable manner.

The V-shaped deflector $B'$ forms a ring within which is located a fan $B^2$, which may and preferably will be of the shape and construction herein shown, it being composed of two dish-shaped sides $b^{13}$ $b^{14}$ united by floats or radial arms $b^{15}$, which form peripheral discharge-mouths for the fan. The dish-shaped side $b^{13}$ of the fan is provided with a substantially central opening into which projects the inlet-pipe $b$, and the closed side $b^{14}$ is provided, as shown, with a hub $b^{16}$, through which extends the shaft $a^{13}$, to which the said hub is secured, as by a screw $b^{18}$. The side wall $b^2$ of the apparatus $A'$ may be solid, or it may be made as herein shown, it being provided with a substantially large central opening normally closed by a cover $b^{20}$, in which one end of the shaft $a^{13}$ is supported, the said shaft being extended through the inlet-pipe $b$ and supported in any suitable manner outside of the case or box $A'$.

The wall $b'$ of the apparatus $A'$ may and preferably will be provided with a substantially large opening normally closed by the cover $b^{22}$. The shaft $a^{13}$ may be driven in any suitable manner.

The operation of the apparatus herein shown may be briefly described as follows: The dust-laden air is drawn through the inlet-pipe $b$ into the center or body portion of the fan $B^2$ and is thrown out at the periphery through the mouths or openings between the floats $b^{15}$, the air as it issues from the periphery of the fan being divided into two streams by the deflector $B'$, one half, $b^{12}$, of the deflector causing the air to take the course indicated by arrow 40, which carries the dust-laden air against the side $b^2$ of the casing, which breaks this current and permits gravity to act on the particles, while the air seeking an outlet is caused to take a return course in the direction indicated by arrow 42 and passes out through the passage $b^9$ into the outlet-space $b^7$. The other half, $b^{10}$, of the deflector causes the current of air acted upon by it to take the course indicated by the arrow 44, which carries the dust-laden air against the side $b'$, where the current of air is broken and gravity permitted to act, while the air seeking an outlet is caused to take a return course in the direction indicated by the arrow 46 and passes out through the passage $b^8$ into the outlet $b^7$.

It is desirable that the dust accumulated in the hopper $a'^a$ of the apparatus $A'$ should be periodically discharged therefrom and this result may be accomplished after the manner herein shown.

The hopper $a'^a$ is provided with an extension $d'$, the front and rear wall of the said extension being shaped so as to form a circularly-shaped mouth $d^3$, with which co-operates a valve or cut-off $d^5$ secured to a shaft $d^6$ having bearings in the extension $d'$, and in practice preferably driven from the shaft $a^{13}$ in any suitable manner.

The valve $d^5$ will preferably be composed of two substantially opposite segmental pieces 3 4, connected to the shaft $d^6$ by a suitable plate or bar $d^{10}$, forming on opposite sides of the said bar pockets or receptacles 5 6, which are adapted to be successively and periodically brought under the hopper.

The shaft $d^6$ is preferably continuously rotated, and the dust particles deposited in the pocket 5 are carried in the pocket until they are discharged out at the bottom of the hopper, and as the pocket 5 is being carried around to the discharge-opening, as described, the pocket 6 is being brought into position to be filled.

During the rotation of the valve $d^5$ the hopper is maintained closed by the segments composing the valve and the plate $d^{10}$.

While I may prefer to employ the valve herein shown, I do not desire to limit my invention in this respect, as other forms of valves may be used.

The dust-separator herein shown and described is equally well adapted among other things for the separation of heavier particles of carbon from smoke, so that the smoke admitted into the apparatus is practically freed from the particles of carbon, and the air issues from the outlet-orifice in a substantially pure condition, while the heavier particles of carbon are deposited in the hopper, and by the term "dust-separator" I desire to include all such uses of the apparatus.

I claim—

In a dust-separator, the combination of the following instrumentalities, viz: a case or box provided with a rim composed of sections having inwardly-projecting walls forming an air-passage between them, the said inwardly-projecting walls having annular openings, an annular V-shaped deflector extended into said openings and forming with the inwardly-projecting walls air-outlets for the casing, and a rotary fan located in the casing within the deflector and provided with a peripheral outlet co-operating with the V-shaped deflector, substantially as described.

In testimony whereof I have signed my name to this specification in the presence of two subscribing witnesses.

MILTON G. DAVIS.

Witnesses:
JAS. H. CHURCHILL,
J. MURPHY.